DATA CODE CONVERSION FOR REMOTE SIGNALLING AND CONTROL SYSTEMS

DATA CODE CONVERSION FOR REMOTE SIGNALLING AND CONTROL SYSTEMS

Filed May 14, 1971

United States Patent Office 3,716,836
Patented Feb. 13, 1973

3,716,836
DATA CODE CONVERSION FOR REMOTE SIGNALLING AND CONTROL SYSTEMS

Raymond Jacquet, Paris, France, assignor to Thomson-CSF, Paris, France
Filed May 14, 1971, Ser. No. 143,477
Claims priority, application France, May 22, 1970, 7018767
Int. Cl. H04q 1/32
U.S. Cl. 340—167 R 5 Claims

ABSTRACT OF THE DISCLOSURE

A message is formed by the output pulses successively delivered by a chain of $(m+1)$ monostable multivibrators, the first one delivering a synchronizing pulse of duration 3T, the other $m$ ones (the time constant of which is made equal to T or $3T/2$ according to the binary signal to be transmitted) delivering the information pulses. When a message has been transmitted a feed back loop triggers the transmission of a further message.

The decoder comprises a synchronizing pulse detector and a chain of $m$ bistable multivibrators controlled by the received signals to restitute the pulses generated in the coder by the first $m$ monostable multivibrators, and $m$ circuits for detecting the duration of these pulses.

The present invention relates to improvements in data coders and decoders, and more particularly to the coders and decoders of remote control and remote signalling transmissions systems.

In the time-division multiplex technique which is conventionally used, the generally large number of signals which have to be transmitted requires a precisely defined timing of the operations of coding and decoding, the time required by each signal being assigned at the transmitting end by a timing unit which is under the control of a clock, a similar clock being provided at the receiving end.

The coded signal comprises a synchronization pulse and $m$ further pulses, each of which, according to the duration thereof, conveys an information "1" or "0," i.e. the presence or absence of a predetermined fact or order.

If the number $m$ originally used happens to be no longer adequate, the timing unit and other parts of the transmitter coder and of the receiver decoder have to be modified.

It is an object of the present invention to simplify the coder circuits at the transmitting end and the decoder circuits at the receiving end of the data-transmission system, by discarding the clocks and the associated circuits. Through making it possible to use modular designs, that is to say ones based upon elementary functional units, the invention achieves wide flexibility in assembly, enabling ready adaptation to the number $m$ of effective signals to be achieved and thus avoiding the difficulties encountered in the known designs.

In accordance with the present invention, there is provided: a data coder, having an output, for the coding of messages comprising a synchronizing signal and a number $m$ of successive binary information pulse signals, each of which has a duration $T_0$ or $T_1$ according to the value 0 or 1 of the corresponding binary information, said coder including, for the generation of said $m$ binary signals, a circuit comprising: $m$ monostable multivibrators connected in series and respectively associated with said $m$ binary signals, said multivibrators having respective inputs and outputs; means for adjusting the time constant of each one of said $m$ multivibrators to one or the other of the values $T_0+T_i$ or $T_1+T_i$, where $T_i$ is a fixed duration, according to whether the corresponding binary signal is to have the duration $T_0$ or $T_1$; triggering means for triggering the first one of said $m$ multivibrators into its semistable state, and a circuit coupled to said $m$ multivibrators for deriving from the pulse signals generated by said $m$ multivibrators corresponding shortened pulses, the duration of which is decreased by said duration $T_i$, and directing said shortened signals, separated by intervals of duration $T_i$, toward said output.

In accordance with the invention, there is further provided a data decoder adapted for decoding the messages coded by means of a coder as claimed in claim 1, said decoder comprising: an input for receiving said coded data; first means coupled to said input for detecting said synchronizing signal; $m$ bistable multivibrators respectively associated with said $m$ binary signals and connected in series so that each one of the first $(m-1)$ bistable multivibrators when passing from its second state into its first state causes the following one to be triggered into its second state; coupling means between said first means and the first one of said $m$ bistable multivibrators for triggering said first bistable multivibrator into its second state; further means controlled by the trailing edges of the respective received binary information pulse signals for respectively triggering back the associated multivibrators into their first states; and $m$ output circuits, respectively coupled to said $m$ bistable multivibrators, for delivering one or the other of two predetermined signals according to whether the duration of the pulse signal delivered by the associated multivibrator is $T_0+T_i$ or $T_1+T_i$.

Other characteristics will be apparent from the ensuing description given purely by way of non limitative example and illustrated in the drawings where:

The invention will be described by way of example, assuming that the coder and decoder are those of a remote control transmission system.

Figure 1:
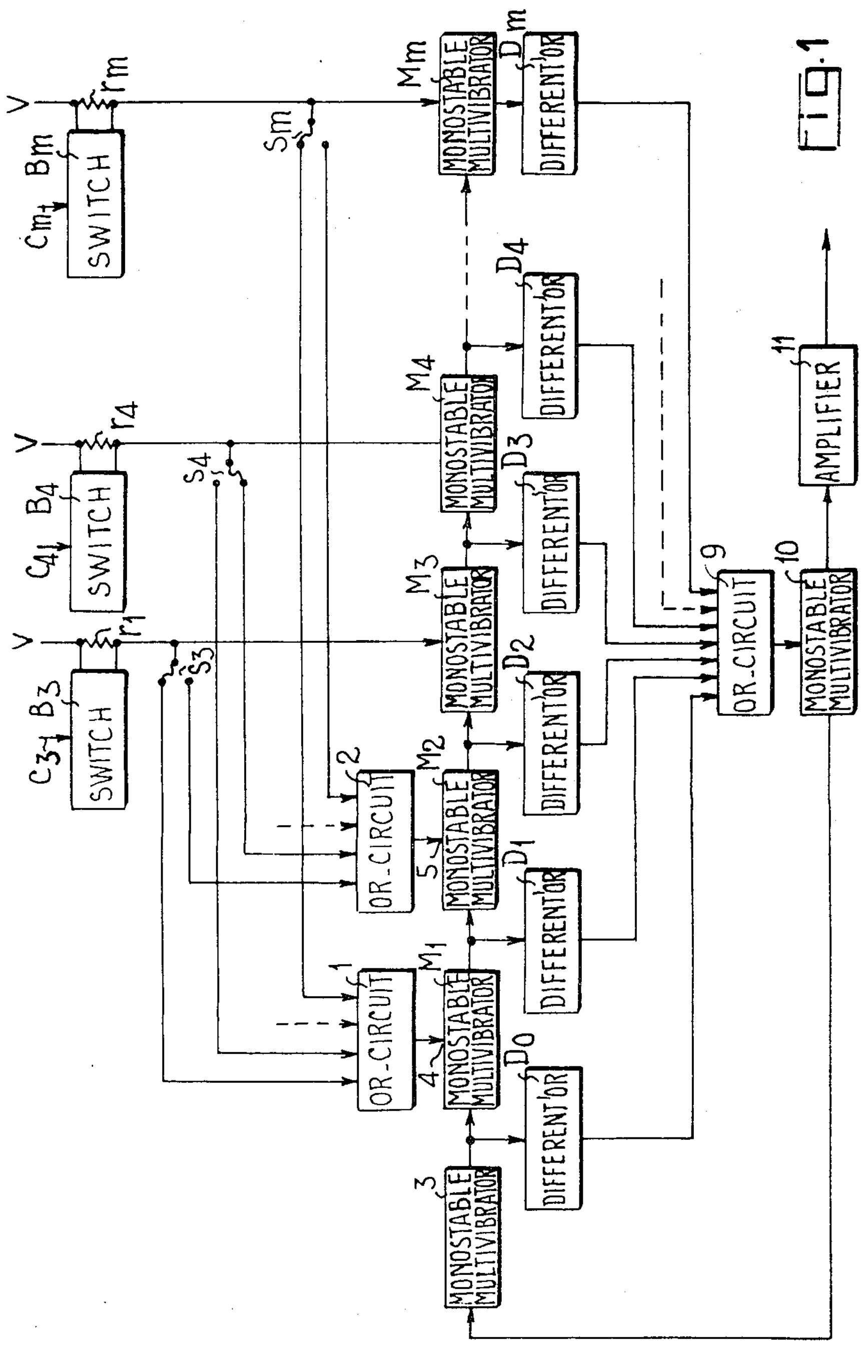
FIG. 1 is a block diagram of one embodiment of the coder of a remote control data transmitter in accordance with the invention.
Figure 2:
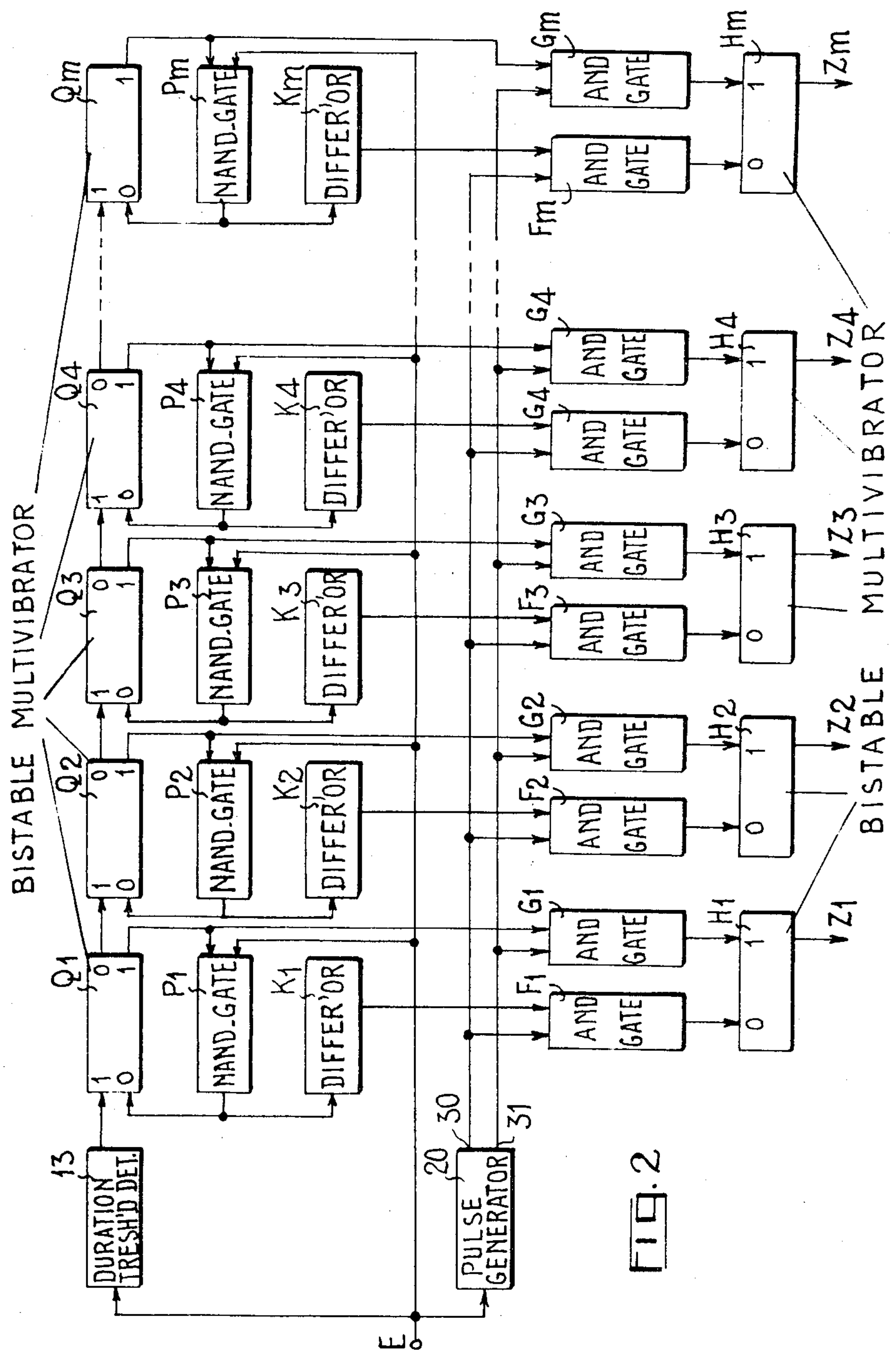
FIG. 2 is a block diagram of one embodiment of a corresponding decoder.

The coder of FIG. 1 comprises $n=m-2$ identical monostable multivibrators $M_3$ to $M_m$, having a common D.C. voltage source V, and the time constant of which, i.e. the duration of the semistable state of which in response to a single triggering pulse, is T. This duration may be extended for each multivibrator $M_i$($i$=3, 4 . . . $m$) to $3T/2$, through inserting an additional resistor $r_i$ between the voltage source and the feeding point of the multivibrator. The corresponding switching is effected by means of an electronic switch $B_i$ connected in parallel with the resistor $r_i$ and which, when closed, acts as a by-pass for this resistor. The $n$ multivibrators are respectively associated with $n$ data to be conveyed, the closing and opening of the switch $B_i$ respectively corresponding to the values 0 and 1 of the $i$th datum, and the control inputs $C_i$ of the $n$ switches being the inputs of the coder.

The output of each switch $B_i$ is on the other hand connected to a terminal of a connection strap $S_i$, the other terminal of which is connected to one or the other of two OR-circuits, 1 and 2, according to whether the value $i$ of the $i$th information should be considered as an urgency case or as a routine one.

The coder comprises three further multivibrators 3, $M_1$ and $M_2$. The time constant of the multivibrator 3 is equal to 3T. The multivibrators $M_1$ and $M_2$ are provided with time constant control systems of the same type as those of the multivibrators $M_3$ to $M_m$, the corresponding resistance insertion systems not being shown but for the auxiliary inputs 4 and 5, playing for the multivibrators $M_1$ and $M_2$ the same part as the inputs $C_i$ for the multivibrators $M_3$ to $M_m$.

The monostable multivibrators 3 and $M_1$ to $M_m$ are serially connected, the output used for the multivibrator 3 delivers an inverted signal, i.e. the resting voltage, which will be assumed to be zero, when the multivibrator 3 is in its semistable state and a voltage 1 when the multivibrator is in its stable state. The outputs used for multivibrators $M_1$ to $M_m$ deliver a noninverted signal, i.e. a pulse of amplitude 1 when they are in their semistable states. The signal inputs of the $(m+1)$ multivibrators are such that each multivibrator is triggered into its semistable state for a decreasing input signal, i.e. the trailing edge of a positive signal.

The outputs of the OR-circuits 1 and 2 are respectively connected to the time constant control inputs 4 and 5 of the multivibrators $M_1$ and $M_2$.

The outputs of the multivibrators 3, and $M_1$ to $M_m$ are respectively connected to the $(m+1)$ inputs of an OR-circuit 9 through respective differentiators $D_0$ and $D_1$ to $D_m$, the first of which $D_0$, comprises an output polarity inverter.

The output of the OR-circuit 9 is connected to the input of a further monostable multivibrator 10, the duration of the semistable state of which is $T/2$. The output used for this multivibrator delivers the afore described inverted signal. Its input is such that the multivibrator is triggered into its semistable state for negative input pulses. The output of the multivibrator 10 is connected on the one hand to the signal input of the multivibrator 3 and on the other hand to the input of an amplifier 11, the output of which is the output of the coder.

The operation of the coder will be described with the help of FIG. 3, the upper portion of which shows as function of time the signals delivered by the multivibrators 3, $M_1$ to $M_m$ and 10.

Through the inputs $C_i$, each switch $B_i$ is made nonconductive when the *i*th datum has the value 1, the corresponding multivibrator being then said to be in its condition "1."

If at least one of those "1" informations is an urgent case, the OR-circuit 1 applies to the time constant control input 4 of the multivibrator $M_1$ a voltage setting it to its condition "1."

In the same way, if there is at least an information "1" which is an "ordinary" one (i.e. not urgent), the OR-circuit 2 sets the multivibrator $M_2$ to its condition "1."

It is thus seen that the multivibrators $M_1$ and $M_2$ in this example are used to convey information items which are derived from the $n$ original data, the corresponding signals being used at the receiving end to actuate two signalling systems, the first of which indicating that a message has been received with at least one urgent information "1," and the second one indicating that a message has been received with at least one non-urgent information "1."

Apart from the fact that the two considered information items are service ones, they are coded, transmitted and decoded exactly in the same manner as the others so that no difference need be made in the following between the cases of the multivibrator $M_1$ and $M_2$ and $M_3$ to $M_m$ and their respective associated circuits.

The information items stored in the multivibrators $M_1$ to $M_m$ are transmitted in the following way:

Assuming that at time $t=0$ the multivibrator 3 receives a triggering pulse, maintaining it in its semistable state, and the multivibrator 10 returns to its stable state while all the other multivibrators are in their stable states, the operation is as follows:

The multivibrator 3 returns to its stable state at time 3T. The differentiator $D_0$ thus delivers a short negative pulse which, through the OR-circuit 9, triggers the multivibrator 10 into its semistable state; this in turn brings back the multivibrator 3 to its semistable state, the latter having thus delivered at its output a very short positive pulse (FIG. 3), the duration of which is disregarded in the description of the timing of the system.

Figure 3:
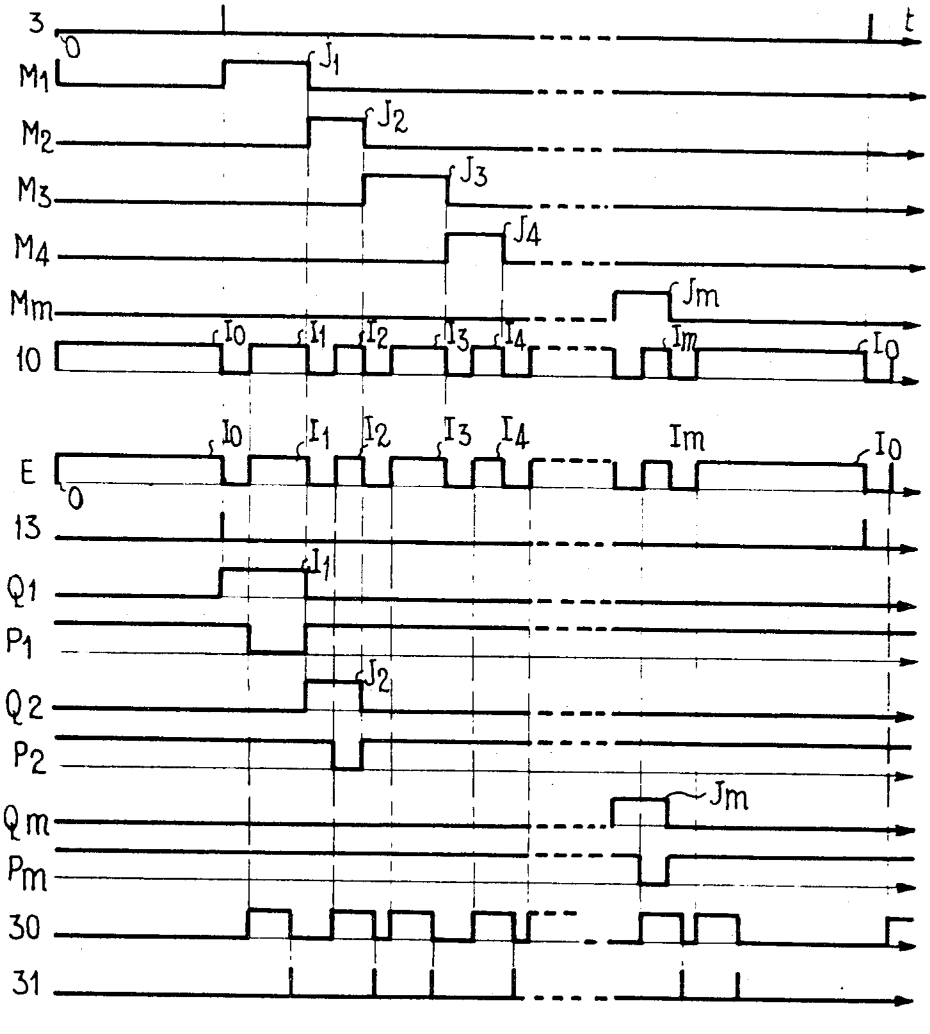
FIG. 3 is a time diagram illustrating the operation of the coder and decoder of FIGS. 1 and 2.

The trailing edge of this pulse causes the multivibrator $M_1$ to pass into its semistable state for a duration $3T/2$ or T according to whether it has been previously set to condition "1" or "0" (the first case has been assumed in FIG. 3).

At time $3T+T/2$, the multivibrator 10 returns to its stable condition, having thus delivered, since time $t=0$, a positive pulse $I_0$ of duration 3T, followed by a zero level of duration $T/2$, this pulse $I_0$ being the synchronization pulse of the message to be transmitted.

At time $3T+T$ or $3T+3T/2$ (the latter being the case assumed in FIG. 3) the multivibrator $M_1$ returns to its stable state having delivered a pulse $J_1$, the duration of which is representative of the binary value of the information to be conveyed. The differentiator $D_1$ derives from the trailing edge of this pulse a short negative pulse which triggers the multivibrator 10 into its semistable state; this, in turn, will maintain the multivibrator 3 in its semistable state for a 3T time interval to come. On the other hand the trailing edge of the pulse $J_1$ triggers the multivibrator $M_2$ into its semistable state.

The process goes further in this way until the multivibrator $M_m$ returns to its stable state, having delivered a pulse $J_m$ of the suitable duration $3T/2$ or T (the latter being the case assumed in FIG. 3), with the same effects as previously as concerns the multivibrators 10 and 3.

At the time $t_1$, separated by a time interval $T/2$ from the time at which the trailing end of the pulse $J_m$ occurred, the conditions prevailing are exactly the same as was assumed at time $t=0$.

The output signal of the multivibrator 10 is the coded message which is transmitted in any conventional way after amplification in amplifier 11.

It will readily be seen that it comprises the synchronizing pulse $I_0$ having a duration 3T followed by $m$ information pulses $I_1$ to $I_m$ respectively corresponding to pulses $J_1$ to $J_m$, each of the $(m+1)$ pulses being followed by a zero level of duration $T/2$ and each pulse $I_j$ $(j=1, 2 \ldots m)$ having a duration of either T or $T/2$ according to whether the corresponding pulse $J_j$ had a duration $3T/2$ or T.

In the case of the figures, it has been assumed that all the informations having the value 1 concerned urgent cases; therefore the pulse $I_1$ has a duration T, and the pulse $I_2$ a duration $T/2$.

FIG. 3 shows a corresponding decoder receiving at its input E, starting from a time $t_r$, which will now be considered as the time origin, the aforesaid message.

The input E is connected to a duration threshold detector 13 delivering a signal only when it receives a pulse of duration greater than 2T, i.e. a synchronizing pulse $I_0$, the signal delivered by the detector 13 being in the form of a short pulse coinciding with the trailing edge of the pulse $I_0$.

This detector may comprise for example, in series, an integrator, a base clipper and a monostable multivibrator, the time constant of which is very small, and which is triggered into its semistable state by the trailing edge of the clipped signal.

The decoder comprises a chain of $m$ bistable multivibrators $Q_1$ to $Q_m$, each of which has two inputs, respectively designated 1 and 0, and two outputs respectively designated 1 and 0. They are caused to pass into their states "1" and "0," respectively, when they receive, respectively at their inputs 1 and 0, signals of increasing amplitude, i.e. the front edges of positive signals.

Each bistable multivibrator delivers at its output 1 a signal of amplitude 1 when it is in its "1" state, and a zero signal when it is in its "0" state, and the inverted signal at its output 0.

The input 1 of the multivibrator $Q_1$ is connected to the output of the duration threshold detector 13, and the $m$ multivibrators are serially connected, the output 0 of each multivibrator being connected to the input 1 of the following one.

The input E is also connected to a pulse generator 20 comprising a differentiator and a monostable multivibrator, the duration of the semistable state of which is $3T/4$, and which is triggered by the front edges of the received pulses. The positive pulses of duration $3T/4$ delivered by the multivibrator of the generator 20 are supplied at the output 30 thereof, and the corresponding inverted signal is applied to the differentiator which thus delivers a short positive pulse coinciding with the trailing edge of the multivibrator output pulse, this short pulse being delivered at the output 31 of the generator.

With the $m$ bistable multivibrators, $m$ identical circuits are respectively associated. The circuit corresponding to any one $Q_j$ ($j=1, 2 \ldots m$) of the multivibrators will now be described.

This circuit comprises a NAND-gate (operating as an AND-gate followed by an inverter) $P_j$, two AND-gates $F_j$ and $G_j$ and a further bistable multivibrator $H_j$, having output $Z_j$ which is one of the $m$ outputs of the decoder.

The NAND-gate $P_j$ has its first input connected to the output 1 of the multivibrator $Q_j$, its second input connected to the input E of the decoder, and its output connected to the input 0 of the multivibrator $Q_j$. The AND-gate $F_j$ has its first input connetced to the output of the NAND-gate $P_j$ through a differentiating circuit $K_j$, and its second input connected to the output 30 of the generator 20. The AND-gate $G_j$ has its first input connected to the output 31 of this generator, and its second input connected to the output 1 of the multivibrator $Q_j$.

The multivibrator $H_j$, which also has an input 0 and an input 1 (as defined hereinabove), has the former connected to the output of the gate $F_j$, and the latter connected to the output of the gate $G_j$.

The bistable multivibrators $H_j$ are triggered into their states "1" and "0" by the front edges of positive pulses.

The operation of the system will be described with reference to the lower portion of FIG. 3 showing the signals appearing at the input E of the decoder and those delivered by the elements 13, $P_1$, $P_2$, $P_m$, the outputs 30 and 31 of the generator 20, and by the elements $Q_1$, $Q_2$, $Q_m$; for the latter the signals are those delivered at their output 1.

Immediately before the arrival of a synchronizing pulse $I_0$ (at time 0) each multivibrator $H_j$ is in the state in which it was left by the preceding message while all the multivibrators $Q_j$ are in their state "0." Consequently the NAND-gates $P_j$ deliver voltages 1. At the end of the synchronizing pulse $I_0$, the detector 13 delivers a short positive pulse which triggers the multivibrator $Q_1$ into its state 1. For the duration of the pulse $I_1$, the output signal from the NAND-gate $P_1$ has the value 0; this value becomes thereafter 1 again, which returns the multivibrator $Q_1$ to the state 0.

It will be seen that the multivibrator $Q_1$ has thus delivered at its output 1 a pulse identical with pulse $J_1$ (delivered by the multivibrator $M_1$ in the coder), while the trough of the signal delivered by the NAND-gate $P_1$ coincides in time with the positive pulse $I_1$.

When returning to state 0, the multivibrator $Q_1$ (through its output 0) triggers the multivibrator $Q_2$ into its state 1, thus playing the part assumed by the detector 13 for the multivibrator $Q_1$. Otherwise the process is exactly the same, the multivibrator $Q_2$ delivers a pulse $J_2$ corresponding to that which was delivered by the multivibrator $M_2$ in the coder and the NAND-gate $P_2$ a signal having a trough corresponding to the pulse $I_2$ and so on.

The multivibrators $H_j$ are respectively used for displaying the successive items of the last received message on their respective outputs $Z_j$. The AND-circuits $F_j$ are used for respectively triggering them into their state "0," when the information to be displayed is "0," and the AND-circuits $G_j$ for respectively triggering them into their state "1," when the information to be displayed is "1."

The operation is the same for all the information items.

The value to be displayed by the multivibrator $H_j$ is 1 or 0 according to whether the duration of the pulse $J_j$ is $3T/2$ or T, i.e. according to whether the duration of the the pulse $I_j$ is T or $T/2$. The AND-gate $F_j$ respectively receives, at its two inputs, from the generator 20 a pulse of duration $3T/4$, the front edge of which coincides in time with that of the pulse $I_j$, and from the differentiator circuit $K_j$ a short positive pulse coinciding in time with the trailing edge of the pulse $I_j$.

Therefore the multivibrator $H_j$ is triggered into its state "0" (if not already therein) or not, according to whether the duration of the pulse $I_j$ is $T/2$ or T.

The AND-gate $G_j$ receives at its second input the pulse $J_j$, and at its first input a short pulse occurring $$T/2+3T/4=5T/4$$

later than the front edge of the pulse $J_j$. Therefore the multivibrator $H_j$ is triggered into its state "1" (if not already therein) or not according to whether the duration of the pulse $J_j$ is $3T/2=6T/4$ or $T+5T/4$.

What is claimed is:

1. A data coder, having an output, for the coding of messages comprising a synchronizing signal and a number $m$ of successive binary information pulse signals, each of which has a duration $T_0$ or $T_1$ according to the value 0 or 1 of the corresponding binary information, said coder including, for the generation of said $m$ binary signals, a circuit comprising: $m$ monostable multivibrators connected in series and respectively associated with said $m$ binary signals, said multivibrators having respective inputs and outputs; means for adjusting the time constant of each one of said $m$ multivibrators to one or the other of the values $T_0+T_1$ or $T_1+T_1$, where $T_1$ is a fixed duration, according to whether the corresponding binary signal is to have the duration $T_0$ or $T_1$; triggering means for triggering the first one of said $m$ multivibrators into its semistable state, and a circuit coupled to said $m$ multivibrators fo deriving from the pulse signals generated by said $m$ multivibrators corresponding shortened pulses, the duration of which is decreased by said duration $T_1$, and directing said shortened pulses, separated by intervals of duration $T_1$, toward said output.

2. A coder as claimed in claim 1, wherein said circuit comprises a monostable multivibrator, the time constant of which is equal to $T_1$, said multivibrator being referred to as the output multivibrator and having an input coupled on the one hand to the outputs of said $m$ multivibrators for receiving triggering signal when said $m$ multivibrators pass into their stable state, and on the other hand to said triggering means for being triggered substantially at the same time as said first one of said $m$ multivibrators.

3. A coder as claimed in claim 2, wherein the duration $T_s$ of said synchronizing signal is larger than either said duration $T_0+T_1$ and $T_1+T_1$ and wherein said triggering means is a further monostable multivibrator having a time constant equal to $T_s$; said further multivibrator being coupled in a closed loop with said output multivibrator so that when said further multivibrator passes into its stable state, said further multivibrator is immediately caused to return to its semistable state, thereby delivering a short pulse which is applied to said first one of said $m$ multivibrators, whereby said output multivibrator automatically delivers successive messages, the synchronizing signal from a message being separated by said time interval $T_1$ from the first binary information signal of this message and from the last binary information signal of the preceding message.

4. A data decoder adapted for decoding the messages coded by means of a coder as claimed in claim 1, said decoder comprising: an input for reeciving said coded data; first means coupled to said input for detecting said synchronizing signal; *m* bistable multivibrators respectively associated with said *m* binary signals and connected in series so that each one of the first $(m-1)$ bistable multivibrators when passing from its second state into its first state causes the following one to be triggered into its second state; coupling means between said first means and the first one of said *m* bistable multivibrators for triggering said first bistable multivibrator into its second state; further means controlled by the trailing edges of the respective received binary information pulse signals for respectively triggering back the associated multivibrators into their first states; and *m* output circuits, respectively coupled to said *m* bistable multivibrators, for delivering one or the other of two predetermined signals according to whether the duration of the pulse signal delivered by the associaed multivibrator is $T_0+T_1$ or $T_1+T_1$.

5. A decoder as claimed in claim 4, wherein said first means are a duration threshold detector for delivering a pulse coinciding with the trailing edge of said synchronzing signal.

References Cited

UNITED STATES PATENTS 3,292,147 12/1966 Dascotte ------- 340—167 RX

HAROLD I. PITTS, Primary Examiner

U.S. Cl. X.R.

340—164 R